US007344758B2

(12) United States Patent
Franchina et al.

(10) Patent No.: US 7,344,758 B2
(45) Date of Patent: Mar. 18, 2008

(54) HYDROCARBON EXTENDERS FOR SURFACE EFFECT COMPOSITIONS

(75) Inventors: Justine Gabrielle Franchina, Hockessin, DE (US); Patrick Henry Fitzgerald, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 171 days.

(21) Appl. No.: 11/175,545

(22) Filed: Jul. 6, 2005

(65) Prior Publication Data

US 2006/0052556 A1 Mar. 9, 2006

Related U.S. Application Data

(60) Provisional application No. 60/607,612, filed on Sep. 7, 2004.

(51) Int. Cl.
*C08F 222/02* (2006.01)
*B05D 3/02* (2006.01)

(52) U.S. Cl. .................. 427/372.2; 526/318.25
(58) Field of Classification Search ............. 427/372.2; 526/518.25

See application file for complete search history.

(56) References Cited

U.S. PATENT DOCUMENTS

| 3,657,173 | A | | 4/1972 | Eanzel et al. |
|---|---|---|---|---|
| 3,752,783 | A | | 8/1973 | Iwantani |
| 4,147,851 | A | | 4/1979 | Raynolds |
| 4,564,561 | A | | 1/1986 | Lore et al. |
| 4,742,140 | A | | 5/1988 | Greenwood et al. |
| 4,937,123 | A | | 6/1990 | Chang et al. |
| 5,055,538 | A | | 10/1991 | Amimoto et al. |
| 5,389,723 | A | * | 2/1995 | Iqbal et al. ............. 525/57 |
| 5,466,770 | A | | 11/1995 | Audenaert et al. |
| 5,798,415 | A | | 8/1998 | Corpart et al. |
| 5,851,595 | A | | 12/1998 | Jones, Jr. |
| 5,919,527 | A | | 7/1999 | Fitzgerald et al. |
| 5,952,409 | A | | 9/1999 | Boardman et al. |
| 6,180,740 | B1 | | 1/2001 | Fitzgerald |
| 6,271,289 | B1 | | 8/2001 | Longoria et al. |
| 6,309,752 | B1 | | 10/2001 | Dams et al. |
| 6,451,717 | B1 | | 9/2002 | Fitzgerald et al. |
| 6,518,380 | B2 | | 2/2003 | Juhue et al. |
| 6,979,711 | B2 | | 12/2005 | Franchina |
| 2003/0175476 | A1 | | 9/2003 | Kurlan et al. |

FOREIGN PATENT DOCUMENTS

| DE | 2012351 | | 10/1970 |
|---|---|---|---|
| DE | 4201603 A1 | | 7/1993 |
| DE | 4426536 A1 | | 2/1996 |
| EP | 552630 A1 | | 7/1993 |
| EP | 1 201 815 A1 | | 5/2002 |
| EP | 1201815 A1 | * | 5/2002 |
| EP | 0 889 157 B1 | | 10/2003 |
| EP | 889157 B1 | * | 10/2003 |
| GB | 1307999 | | 2/1973 |
| JP | 56009478 A2 | | 1/1981 |
| JP | 59047716 B4 | | 11/1984 |
| JP | 1993-026783 A | | 2/1993 |
| JP | 1995-030307 A | | 1/1995 |
| JP | 1997-291481 A | | 11/1997 |
| JP | 2000-144117 A | | 5/2000 |
| JP | 2000-282015 A | | 10/2000 |
| WO | WO92/17636 | | 10/1992 |
| WO | WO 94/25662 A1 | | 10/1994 |
| WO | WO 95/33093 A | | 12/1995 |
| WO | WO 96/38622 | | 12/1996 |
| WO | WO 97/00230 A1 | | 1/1997 |
| WO | WO 01/19883 A1 | | 3/2001 |

* cited by examiner

Primary Examiner—Robert D. Harlan

(57) ABSTRACT

A polymer extender composition for use with fluorochemical repellents, said composition comprising monomers copolymerized in the following percentages by weight:

(a) from about 60% to about 94% of a monomer, or mixture of monomers, of the formula I:

$$[CH_3-(CH_2)_p][CH_3(CH_2)_n]CHCH_2-OC(O)-C(R)=CH_2, \text{ and} \quad (I)$$

(b) from about 5% to about 20% of a monomer, or mixture of monomers, of the formula II:

$$H-(OCH_2CH_2)_m-O-C(O)-C(R)=CH_2 \quad (II)$$

wherein
each R is independently H or $CH_3$;
n is 1 to 10;
p is 1 to 20 and
m is 2 to 10 is disclosed.

24 Claims, No Drawings

HYDROCARBON EXTENDERS FOR SURFACE EFFECT COMPOSITIONS

FIELD OF THE INVENTION

Hydrocarbon polymers are employed as extenders to improve the performance of treating agents which provide surface effects to treated substrates.

BACKGROUND OF THE INVENTION

Various compositions are known to be useful as treating agents to provide surface effects to substrates. Surface effects include repellency to moisture, soil and stain resistance, and other effects which are particularly useful for fibrous substrates such as fibers, fabrics, textiles, carpets, paper, leather and other such substrates. Many such treating agents are fluorinated polymers or copolymers.

Fluorinated polymer compositions having utility as fibrous substrate treating agents generally contain pendant perfluoroalkyl groups of three or more carbon atoms, which provide oil- and water-repellency when the compositions are applied to fibrous substrate surfaces. The perfluoroalkyl groups are generally attached by various connecting groups to polymerizable groups not containing fluorine. The resulting monomer is then generally copolymerized with other monomers which confer additional favorable properties to the substrates. Various specialized monomers may be incorporated to impart improved cross-linking, latex stability and substantivity. Since each ingredient may impart some potentially undesirable properties in addition to its desirable ones, the specific combination is directed to the desired use. These polymers are generally marketed as aqueous emulsions for easy application to the fibrous substrates.

Various attempts have been made to increase the oil- and water-repellency imparted to the substrate and its durability while reducing the amount of fluorinated polymer required, i.e., boost the efficiency or performance of the treating agent. One method is to incorporate blocked isocyanates or melamine resins. However, only limited amounts can be used because these ingredients tend to adversely affect the handle (the feel) of the fibrous substrate. Another method is the use of various extender polymers. These are typically hydrocarbon polymers in aqueous emulsions, which are blended with the fluorinated polymer emulsion before application to the substrate.

U.S. Pat. No. 3,657,173 discloses an emulsion suitable for imparting oil and/or water-repellency to substrates, containing a fluorinated polymer and a major amount of a halogenated solvent, a minor amount of an alkanol, and water. Optionally the emulsion may also contain a non-fluorine containing polymer, (i.e., an extender polymer), of at least one monovinyl compound free of non-vinylic fluorine atoms, or a non-fluorinated conjugated diene. Examples of the extender polymer are 2-hydroxy ethyl- or 2-hydroxy propyl-acrylate or methacrylate; and n-lauryl methacrylate or 2-ethylhexyl methacrylate. It is also said to be advantageous to include in all these polymers a small amount of units derived from N-methylolacrylamide or N-methylolmethacrylamide and glycidyl acrylate or methacrylate to improve durability of the polymer solids to laundering or dry-cleaning.

There is a need for polymer compositions which significantly improve the performance of surface effect agents. In particular, there is a need for compositions which improve the durability of surface effects for substrates while reducing the amount of fluorinated polymer required. The present invention provides such a composition.

BRIEF SUMMARY OF THE INVENTION

The present invention comprises a polymer composition for use with treating agents providing a surface effect to substrates, comprising monomers copolymerized in the following percentages by weight:

(a) from about 60% to about 94% of a monomer, or mixture of monomers, of the formula I:

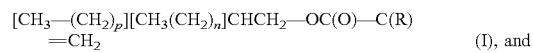

(I), and (b) from about 5% to about 20% of a monomer, or mixture of monomers, of the formula II:

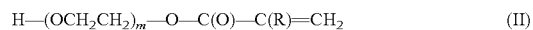

(II)

(c) from about 0% to about 3% of a monomer, or mixture of monomers, of the formula III:

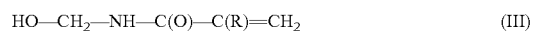

(III)

(d) from about 0% to about 20% of a monomer, or mixture of monomers, of formula IV:

(IV)

(e) from about 0% to about 2% of ethylene dimethacrylate, and (f) from about 0% to about 10% of a monomer, or mixture of monomers, of formula (V):

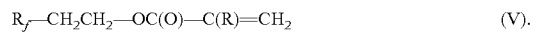

(V).

wherein
each R is independently H or $CH_3$;
$R^1$ is an alkyl chain from 1 to about 18 carbon atoms;
n is 1 to about 10;
p is 1 to about 20 and
m is 2 to about 10, and
$R_f$ is a straight or branched-chain perfluoroalkyl group of from 2 to about 20 carbon atoms, or a mixture thereof.

The present invention further comprises a method of treating a substrate comprising contacting said substrate with a composition comprising a treating agent which when applied to a substrate provides a surface effect and the above-described composition.

The present invention further comprises a substrate treated with a composition comprising a treating agent which when applied to a substrate provides a surface effect and the above-described composition.

DETAILED DESCRIPTION OF THE INVENTION

Trademarks are indicated herein by capitalization.

This invention comprises a polymer composition useful for improving the durability performance of treating agents which provide surface effects to substrates. In particular, the extender composition is useful for improving the performance of fluorinated polymers in imparting durable repellent properties to fibrous substrates. The fibrous substrates include fibers, textiles, paper, nonwovens, leather, carpets, fabrics, fabric blends or a combination thereof. By "fabrics" is meant natural or synthetic fabrics, or blends thereof, composed of fibers such as cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers.

Superior durable surface properties, along with desirable properties of low yellowing and good durability, are imparted to fibrous substrates by the addition of the inventive extender polymer composition to surface treating agents before application to fibrous substrates. These combined blends are applied to the fibrous substrates in the form of a dispersion in water or other solvent either before, after or during the application of other treatment chemicals.

When so applied, the extender composition of this invention in combination with a fluorinated polymer treating agent has been found in particular to improve the durability of surface properties, especially oil- and water-repellency, in fibrous substrates after laundering by as much as 50%. The durability of the repellency is improved compared to other known extender compositions. Further, use of the extender composition of the present invention increases fluorine efficiency by permitting use of lower levels of the fluorinated polymer.

The extender polymer compositions of this invention are prepared by conventional emulsion polymerization techniques, such as those used to make fluorinated polymers. Generally, such copolymers are prepared by copolymerization of two or more monomers in an aqueous media with the resulting dispersion or emulsion stabilized with a surfactant. Optionally, the copolymerization is carried out by solution polymerization, wherein an organic water-soluble solvent, such as alcohol or glycol, is added to the aqueous media to improve the solubility of the monomers. The surfactant employed to stabilize the emulsion during its formation and during polymerization can be a conventional anionic, cationic and/or nonionic emulsifying agent or agents. The polymerization is conveniently initiated by azo initiators such as 2,2'-azobis(2-amidinopropane) dihydrochloride. These initiators are sold by E. I. du Pont de Nemours and Company, Wilmington, Del., commercially under the name of "VAZO".

The aqueous dispersion blends produced by mixing the extender composition dispersion with a fluorinated polymer dispersion are applied to surfaces of fibrous substrates by known methods to impart oil-, soil- and water-repellency and other surface effects. A distinguishing feature of use of the fluorinated polymer-extender compositions of the present invention is high durability of the repellent finish on the fabric.

The composition of the present invention comprises a copolymer comprising monomers copolymerized in the following percentages by weight:

(a) from about 60% to about 94% of a monomer, or mixture of monomers, of the formula I:

$$[CH_3-(CH_2)_p][CH_3(CH_2)_n]CHCH_2-OC(O)-C(R)=CH_2 \quad (I)$$

(b) from about 5% to about 20% of a monomer, or mixture of monomers, of the formula II:

$$H-(OCH_2CH_2)_m-O-C(O)-C(R)=CH_2 \quad (II)$$

(c) from about 0% to about 3% of a monomer, or mixture of monomers, of the formula III:

$$HO-CH_2-NH-C(O)-C(R)=CH_2 \quad (III)$$

(d) from about 0% to about 20% of a monomer, or mixture of monomers, of formula IV:

$$R^1-OC(O)-C(R)=CH_2 \quad (IV)$$

(e) from about 0% to about 2% of ethylene dimethacrylate, and (f) from about 0% to about 10% of a monomer, or mixture of monomers, of formula (V):

$$R_f-CH_2CH_2-OC(O)-C(R)=CH_2 \quad (V)$$

wherein
each R is independently H or $CH_3$;
$R^1$ is an alkyl chain from 1 to about 18 carbon atoms;
n is 1 to about 10;
p is 1 to about 20 and m is 2 to about 10, and
$R_f$ is a straight or branched-chain perfluoroalkyl group of from 2 to about 20 carbon atoms, or a mixture thereof.

The term "(meth)acrylate" is used herein to mean either methacrylate, acrylate or a mixture of the two.

The required monomer (a) of formula I in the present invention is one or a mixture of branched-chain alkyl(meth) acrylates having about 6 to about 34 carbon atoms in its alkyl chain. It is added to the polymerization in proportions from about 60% to about 94% by weight. Preferably the proportion of monomer (a) in the copolymer is between about 70% and about 90% by weight. Preferably the branched-chain (meth)acrylate is 2-ethylhexyl(meth)acrylate.

The required monomer (b) of formula II in the present invention is one or a mixture of ethoxylated (meth)acrylates wherein the number of ethoxy groups is between 2 and about 10. Between about 5 and about 10 ethoxy groups are preferred. It is added to the polymerization in proportions from about 5% to about 20% by weight. Preferably the proportion of monomer (b) in the extender copolymer is between about 8% and about 15% by weight.

The optional monomer (c) of formula III in the present invention is N-methylol acrylamide, N-methylol methacrylamide or a mixture of the two. N-methylol acrylamide is preferred. It is added to the polymerization in proportions of 0% to about 3%. About 1% by weight is preferred. This monomer is typically employed to help improve durability of the repellency properties imparted to the treated substrate.

Optional monomer (d) of formula IV is a linear alkyl chain (meth)acrylate wherein the alkyl chain has between 1 and about 18 carbon atoms. Methyl methacrylate is preferred. It is added to the polymerization in proportions from 0 to about 20% by weight. About 12% by weight is preferred.

Optional monomer (e) is ethylene dimethacrylate, $[CH_2CH(CH3)C(O)OCH_2CH_2]_2$. It is added to the polymerization in proportions from 0 to about 2%. About 0.5% by weight is preferred. Inclusion of monomers (d) and (e) provides flexibility to adapt to various specific substrates while maintaining effective performance.

Optional monomer (f) of formula V is a perfluoro(meth) acrylate with a straight or branched-chain perfluoroalkyl group of from about 2 to about 20 carbon atoms or a mixture thereof. Preferably, the perfluoroalkyl group $CF_3CF_2(CF_2)_x-$ has from about 6 to about 18 carbon atoms, or a mixture thereof. A perfluoro(meth)acrylate is preferred of the formula: $CF_3CF_2(CF_2)_xC_2H_4OC(O)-C(CH_3)=CH_2$, wherein x is 6, 8, 10, 12, 14, 16, and 18 in a mixture in the respective relative amounts of about 33%, 24%, 12%, 6%, 2%, 1% and 0.5%, and said monomer has a weight average molecular weight of about 583. It is added to the polymerization in proportions from about 0 to about 10%, with 0% being preferred. The presence of this monomer may enhance compatibility in the blend with the fluorochemical treatment agent.

The copolymer dispersions described above are then blended with any of a variety of known treating agents for fibrous substrates. Examples of fluorinated polymer treating agents are ZONYL available from E. I. du Pont de Nemours and Company, Wilmington, Del.; OLEOPHOBOL from Ciba Specialty Chemicals, Langweid, Germany; ASAHI GARD from Asahi Glass Company, Ltd., Tokyo, Japan; UNIDYNE from Daikin America, Inc., Orangeburg, N.Y.; SCOTCHGARD from 3M Company, St. Paul, Minn.; and NANO TEX from Nanotex, Emeryville, Calif. Of particular interest are fluorinated polymers useful as treating agents to provide repellency properties to the surface of treated substrates. The copolymer dispersion is blended with the fluorinated polymer in a ratio of from about 1:10 to about 6:1, preferably from about 1:3 to about 3:1, and more preferably from about 2:1 to about 1:2. The fluorine content of the blend is from about 1.5% to about 6.6% by weight, preferably from about 2.0% to about 4.0% by weight. The fluorinated polymer treating agents are any of those used for creating water or oil repellency on a fibrous substrate. These include fluorochemical compounds or polymers containing one or more fluoroaliphatic groups (designated here as $R_f$ groups) which are fluorinated, stable, inert, non-polar, preferably saturated, monovalent and both oleophobic and hydrophobic. The $R_f$ groups preferably contain at least 3 carbon atoms, more preferably 3 to 20 carbon atoms, and most preferably about 6 to about 14 carbon atoms. The $R_f$ groups may contain straight or branched chain or cyclic fluorinated alkylene groups or combinations thereof. The terminal portion of the $R_f$ groups is a perfluorinated aliphatic group of the formula $C_nF_{2n+1}$ wherein n is from about 3 to about 20.

Examples of such fluorinated polymers preferably include $R_f$-containing polyurethanes and poly(meth)acrylates. Especially preferred are copolymers of fluorochemical (meth) acrylate monomers with a co-polymerizable monovinyl compound or a conjugated diene. The co-polymerizable monovinyl compounds include alkyl(meth)acrylates, vinyl esters of aliphatic acids, styrene and alkyl styrene, vinyl halides, vinylidene halides, alkyl esters, vinyl alkyl ketones, and acrylamides. The conjugated dienes are preferably 1,3-butadienes. Representative compounds within the preceding classes include the methyl, propyl, butyl, 2-hydroxypropyl, 2-hydroxyethyl, isoamyl, 2-ethylhexyl, octyl, decyl, lauryl, cetyl, and octadecyl acrylates and methacrylates; vinyl acetate, vinyl propionate, vinyl caprylate, vinyl laurate, vinyl stearate, styrene, alpha methyl styrene, p-methylstyene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylolacrylamide, N-methylolmethacrylamide, glycidyl acrylate, glycidyl methacrylate, and polyoxymethacrylates.

The blended composition comprising a fluorinated polymer and the extender polymer of the present invention applied to the fibrous substrate optionally further comprises a blocked isocyanate to promote durability, added after copolymerization (i.e., as a blended isocyanate). An example of a suitable blocked isocyanate is HYDROPHOBOL XAN available from Ciba Specialty Chemicals, High Point, N.J. Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the fibers. When added as a blended isocyanate, amounts up to about 20% by weight are added.

The blended composition comprising a fluorinated polymer and the extender composition of the present invention optionally further comprises additional components such as treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the blended composition and applied to the fibrous substrate. Other additives commonly used with such treating agents or finishes may also be present such as surfactants, pH adjusters, cross linkers, wetting agents, wax extenders, and other additives known by those skilled in the art. Further, other extender compositions are optionally included to obtain a combination of benefits.

The present invention further comprises a method of treating substrates comprising contacting the surface of the substrate with an effective amount of a composition comprising an extender composition of the present invention as described above and a treating agent which provides a surface effect when applied to a substrate. Preferably, the treating agent is a fluorinated polymer. The blended compositions are applied to the fibrous substrate to be treated from aqueous dispersions, either alone or in a mixture with other textile treatment agents, finishes or additives as described above. For example, when synthetic fabrics are treated, a wetting agent can be used, such as ALKANOL 6112 available from E. I. du Pont de Nemours and Company, Wilmington, Del. As a further example, when cotton or cotton-blended fabrics are treated, a wrinkle-resistant resin can be used such as PERMAFRESH EFC available from Omnova Solutions, Chester, S.C. As a further example, when nonwoven fabrics are treated, a wax extender can be employed such as FREEPEL 1225WR, available from Omnova Solutions Chester, S.C. An antistat such as ZELEC KC, available from Stepan, Northfield, Ill., or a wetting agent, such as hexanol, also are suitable. The dispersions are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features. The treated fibrous substrate has a fluorine content of from about 0.05% to about 0.5% by weight.

The present invention further comprises substrates treated with the above-described composition comprising i) a treating agent which provides a surface effect and ii) the extender copolymer of the present invention as described above. The composition also can contain optional agents to provide additional surface effects as described above, optional additives commonly used in treating substrates as described above, optional blocked isocyanate as described above, and optional additional distinct extender compositions. As previously noted such substrates include paper, nonwovens, leather, fibers, textiles, fabrics, fabric blends, or combinations thereof. "Fabrics" includes natural or synthetic fabrics composed of fibers of cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers. Preferably, the substrate has been treated with a composition comprising an extender composition of the present invention and a fluorinated polymer such as a polyurethane or poly (meth)acrylate.

Specifically, the copolymer compositions, method and treated substrates of the present invention are useful to enhance surface properties, especially durability of oil-, water- and soil-repellency, of the above-described substrates while reducing the amount of fluorinated polymer employed. The repellency property is more durable than applications of fluorinated polymer treating agents with other extenders, and is effective for various fibrous substrates. The repellency property is effective with a variety of other surface effects. The treated fibrous substrates of the present invention are useful in a variety of applications such as for textiles, clothing, uniforms, protective garments, furnishings, and the like. The copolymers of the present invention are advantageous in that when blended with fluorinated polymer treating agents, they give highly durable, low yellowing repellent finishes over a wide range of fibrous substrates while using a reduced level of the fluorinated polymer. The inventive compositions are made at lower materials cost than the currently available acrylate copolymers.

Test Methods

The following tests were employed in evaluating the examples herein.

Test Method 1—Fabric Treatment

The fabric was treated with the copolymer blend using a conventional pad bath (dipping) process. A bath containing 0.2-5% by weight of the fluorinated polymer treating agent blended with the extender copolymer of the present invention (hereinafter copolymer blend), as detailed in the Tables in the Example section, was used to treat fabrics, such as cotton, nonwoven, and nylon fabrics, in combination with a blocked isocyanate (0-2%) as indicated. A bath containing 30-45 g/L of the copolymer blend was used. The fluorochemicals used for blending with the nonfluorinated copolymer extenders of the present invention were commercial ZONYL products that are available from E. I. du Pont de Nemours and Company, Wilmington, Del. After application, the woven fabrics were cured at approximately 160° C. for 1-3 minutes, and the nonwoven fabrics were cured at 100-170° C. for 2-4 minutes. The fabric was allowed to "rest" after treatment and cure.

Test Method 2—Water Repellency

The water repellency of a treated substrate was measured according to the DuPont Technical Laboratory Method as outlined in the TEFLON® Global Specifications and Quality Control Tests information packet or AATCC standard Test Method No. 193-2004. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance of a finished substrate to staining by water-based substances. The composition of standard test liquids is shown in the following table.

TABLE 1

Standard Test Liquids

| Water Repellency Rating Number | Composition, Isopropyl Alcohol | Vol % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 3—Water Repellency—Spray Rating

Water repellency can be further tested by utilizing the spray test method. The treated fabric samples were tested for water repellency by following the AATCC standard Test Method No. 22-1996, conducted as follows. A fabric sample, treated with an aqueous dispersion of polymer as previously described, is conditioned for a minimum of 2 hours at 23° C.+20% relative humidity and 65° C.+10% relative humidity. The fabric sample is securely fastened on a plastic/metal embroidery hoop such that the fabric is wrinkle-free. The hoop is placed on the testing stand so that the fabric is facing up. Then 250 mL of water at 80±2° F. (27±1° C.) is poured into the testing funnel allowing the water to spray onto the fabric surface. Once the water has run through the funnel, the hoop is rapped against the edge of a solid object with the fabric facing down, rotated 180 degrees and rapped again. The spotted or wetted surface is compared with the AATCC standards found in the AATCC Technical Manual. The more wet the surface, the lower the number and the poorer the repellency. A 100 denotes no wetting, a 90 denotes slight wetting (three small spots), an 80 denotes wetting signified by several (10) spots at the spray points, a 70 denotes partial wetting of the upper fabric surface, a 50 denotes wetting of the entire upper fabric surface, and a 0 denotes complete wetting of the lower and upper fabric surface.

Test Method 4—Oil Repellency

The treated fabric samples were tested for oil repellency by a modification of AATCC standard Test Method No. 118, conducted as follows. A fabric sample, treated with an aqueous dispersion of polymer as previously described, is conditioned for a minimum of 2 hours at 23° C.+20% relative humidity and 65° C.+10% relative humidity. A series of organic liquids, identified below in Table I, are then applied drop wise to the fabric samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating of the fabric is the highest numbered test liquid for which two of the three drops remained spherical to hemispherical, with no wicking for 30 seconds. In general, treated fabrics with a rating of 6 or more are considered good to excellent; fabrics having a rating of one or greater can be used in certain applications.

TABLE 2

Oil Repellency Test Liquids

| Oil Repellency Rating Number | Test Solution |
|---|---|
| 1 | NUJOL Purified Mineral Oil |
| 2 | 65/35 NUJOL/n-hexadecane by volume at 21° C. |
| 3 | n-hexadecane |
| 4 | n-tetradecane |
| 5 | n-dodecane |
| 6 | n-decane |
| 7 | n-octane |
| 8 | n-heptane |

Note:
NUJOL is a trademark of Plough, Inc., for a mineral oil having a Saybolt viscosity of 360/390 at 38° C. and a specific gravity of 0.880/0.900 at 15° C.

Test Method 5—Impact Repellency Procedure

Water resistance can be further tested by utilizing the impact test method. The treated fabric samples were tested for water repellency by following the AATCC standard Test Method No. 42-2000, conducted as follows. A fabric sample, treated with an aqueous dispersion of copolymer blend as previously described, is conditioned for a minimum of 2 hours at 23° C. plus 20% relative humidity and 65° C. plus 10% relative humidity. The fabric sample is securely fastened on flat surface, that sits at a 45-degree angle, such that the fabric is wrinkle-free. A piece of blotter paper, the same size that the fabric, is placed behind the fabric. Then 500 mL of water at 82±2° F. (27±1° C.) is poured into the testing funnel allowing the water to spray onto the fabric surface. Once the water has run through the funnel, the blotter paper is weighed. An increase in weight that is less than a half a gram is considered very good.

Test Method 6—Laundering Procedure

The fabric samples were laundered according to the U.S. Home Laundering Method outlined in the TEFLON Global Specifications and Quality Control Tests information packet. Fabric samples are loaded into a KENMORE automatic washer with a ballast load to give a total dry load of 4 lb. (1.0 kg). A commercial detergent is added (AATCC 1993 Standard Reference Detergent WOB) and the washer is filled to a high water level with warm water (105° F.)(41° C.). The samples and ballast are washed a designated number of times (5 HW=5 washes, 10 HW=10 washes, etc.) using a 12-minute normal wash cycle followed by rinse and spin cycles. The samples are not dried between wash cycles.

After washing is complete, the wet fabric samples and ballast are transferred to a KENMORE automatic dryer and dried for 45 minutes at the high/cotton setting to achieve a vent temperature of 155-160° F. (68-71° C.).

EXAMPLES

The following materials are used in the Examples as indicated.

ARMEEN DM-12D is N,N-dimethyidodecyl amine available from Akzo Chemicals Inc., Chicago, Ill.

ARMEEN DM-18D is N,N-dimethyloctadecyl amine available from Akzo Chemicals Inc., Chicago, Ill.

VAZO 56 WSP is an azo polymerization initiator 2,2'-azobis(2-amedinopropane)dihydrochloride available from E. I. du Pont de Nemours and Company, Wilmington, Del.

ZONYL 7700, ZONYL 8315, ZONYL 8932 and ZONYL 8300 are each fluorochemicals useful as treating agents for textiles available from E. I. du Pont de Nemours and Company, Wilmington, Del.

Example 1

To begin, 70 g of 2-ethylhexylmethacrylate; 10 g of poly(oxyethylene)7 methacrylate; 2 g of aqueous 48% N-methylol-acrylamide; 0.3 g of dodecyl mercaptan, 20 g hexylene glycol, 1.6 g of ARMEEN DM 18D, 1.0 g acetic acid, 3 g of aqueous 2% salt (NaCl) solution, and 80 g of hot (50-60° C.) deionized water were emulsified and then charged to a four-necked flask fitted with a stirrer, thermocouple thermometer, and water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g deionized water was added to initiate polymerization. The temperature of the mix rose spontaneously to 79° C. over about 12 minutes, and then began to decline. The temperature controller was reset to 70° C., and the charge was stirred for 4 hours under nitrogen. The resulting polymer extender latex (dispersion in water) weighed 251 g with solids content of 31.7%. It was separately blended with commercially available fluorochemicals, ZONYL 7700, ZONYL 8315 and ZONYL 8932 from E. I. du Pont de Nemours and Company, Wilmington, Del. in a ratio of 1:2 of fluorochemical to extender.

The blend with ZONYL 7700 was applied to a 100% polypropylene nonwoven substrate using the process of Test Method 1. A total of 32 g/L of the blended product was used in the pad bath. The blended product contained 31% of ZONYL 7700 and 69% of the non-fluorinated extender, which gave a blended product with about 2.3% fluorine. About 5 g/L of a wetting agent (hexanol) was used in the pad bath. About 2 g/L of an anti-stat, ZELEK KC, available from Stepan, Northfield, Ill., was also used in the pad bath. After application, the nonwoven fabrics were cured at about 100° C. for about 4 minutes. The fabric was allowed to "rest" after treatment and cure. The polypropylene nonwoven was tested for water repellency using Test Method 2 described above. ZONYL 7200 with no extender present was applied to the substrate in the same manner for comparison. Results are in Table 3.

The blend with ZONYL 8315 was applied to a 100% polyester nonwoven substrate using the fabric treatment process described above in Test Method 1. 20 g/L of the blended product was used in the pad bath. The blended products contained about 2.7% fluorine. Approximately 15 g/L of a wax extender was used, FREEPEL 1225WR, available from Omnova Solutions, Chester, S.C. After application, the nonwoven fabrics were cured at about 170° C. for about 2 minutes. The fabric was allowed to "rest" after treatment and cure. The polyester nonwoven was tested for water repellency, spray repellency, and impact repellency using Test Methods 2, 3 and 5 as described above. ZONYL 8315 with no extender present was applied to the substrate in the same manner for comparison. Results are listed in Table 4.

The blend with ZONYL 8932 was applied to 100% nylon fabric using Test Method 1 described above. The bath contained 45 g/L of the blended product. The blended product contained about 3.5% fluorine. For one sample, the bath contained between 0 and 1 g/L blocked isocyanate. The blocked isocyanate used was HYDROPHOBOL XAN, Ciba Specialty Chemicals, High Point, N.C. A wetting agent was also included in the bath at 2 g/L. This was ALKANOL 6112 available from E. I. du Pont de Nemours and Company, Wilmington, Del. After application, the fabrics were cured at about 160° C. for 3 minutes. The fabric was allowed to "rest" after treatment and cure. The nylon was tested for oil repellency, water repellency and spray repellency using Test Methods 4, 2 and 3 described above. ZONYL 8932 with no extender present was applied to the substrate in the same manner for comparison. Results are listed in Table 5.

Example 2

The procedure of Example 1 was followed except that 4 g BRIJ 58 available from Uniqema, New Castle, Del., was also added before emulsification. Yield was 252 g of polymer extender latex at 33.1% solids which was blended with the fluorochemicals in a ratio of 1:2 of fluorochemical to extender, and applied to polypropylene and polyester nonwovens as described in Example 1. The fabric was tested as described in Example 1. Results are in Tables 3 and 4.

Comparative Example A

To begin, (a) 80 g of 2-ethylhexylmethacrylate; (c) 3.3 g of aqueous 48% N-methylol-acrylamide; (e) 0.4 ethylene dimethacrylate; 1.6 g of ARMEEN DM 18D, 1.0 g acetic acid, 3 g of aqueous 2% salt (NaCl) solution, and 135 g of warm (40-50° C.) water were emulsified and then charged to a four-necked flask fitted with a stirrer, thermocouple thermometer, and a dry ice or water condenser. The charge was rinsed into the flask with 20 g of cool deionized water purged with nitrogen at 50° C. for 30 minutes. Then the nitrogen was switched to a slow sweep, and 19 gm of acetone was added. Then, 0.02 g of "VAZO" 56 WSP (E. I. du Pont de Nemours and Company, Wilmington, Del.) was then added to initiate polymerization. The temperature was ramped steadily up to 70° C. over about 30 minutes. The temperature continued to rise to 73° C. over the next 10-12 minutes. The charge was stirred for 3.5 hours at 70° C. under nitrogen. The resulting polymer latex weighed 244 g with solids content of 31.4%. It was blended at a ratio of about 2:1 of extender to fluorochemical with commercially available fluorochemicals as listed in Table 5. The blend was applied to nylon fabric and tested as in Example 1. Results are listed in Table 5.

Comparative Example B

To begin, (a) 80 g of 2-ethylhexylmethacrylate; (c) 3.3 g of aqueous 48% N-methylol-acrylamide; 1.6 g of ARMEEN DM 18D, 1.0 g acetic acid, 3 g of aqueous 2% salt (NaCl) solution, and 135 g of warm (40-50° C.) water were emulsified and then charged to a four-necked flask fitted with a stirrer, thermocouple thermometer, and a dry ice or water condenser. The charge was rinsed into the flask with 20 g of cool deionized water purged with nitrogen at 50° C. for 30 minutes. Then the nitrogen was switched to a slow sweep, and 19 gm of acetone was added. Then, 0.02 g of "VAZO" 56 WSP (E. I. du Pont de Nemours and Company, Wilmington, Del.) was then added to initiate polymerization. The temperature was ramped steadily up to 70° C. over about 30 minutes. The temperature continued to rise to 73° C. over the next 10-12 minutes. The charge was stirred for 3.5 hours at 70° C. under nitrogen. The resulting polymer latex weighed 242 g with solids content of 31.2%. It was blended at a ratio of about 2:1 of extender to fluorochemical with commercially available fluorochemicals as listed in Tables 4 and 5. The blend was applied to a polyester nonwoven substrate and a nylon fabric and tested as in Example 1. Results are listed in Tables 4 and 5.

TABLE 3

| | Polypropylene nonwoven | | |
|---|---|---|---|
| Fluorochemical | ZONYL 7700 | ZONYL 7700 | ZONYL 7700 |
| Example Extender Water Repellency | None | 1 | 2 |
| Initial Spray Repellency | 11 | 11 | 11 |
| Initial | 90 | 90 | 90 |

Table 3 illustrates the efficacy of the extenders of the present invention. The bath used to treat the nonwoven had 40% less fluorochemical when the extender of Examples 1 and 2 were present vs. no extender present, while the performance of the treatment was maintained.

TABLE 4

| | Polyester nonwoven | | | |
|---|---|---|---|---|
| Fluorochemical | ZONYL 8315 | ZONYL 8315 | ZONYL 8315 | ZONYL 8315 |
| Example Extender Water Repellency | None | 1 | 2 | Comp. B |
| Initial Spray Repellency | 8 | 8 | 8 | 6 |
| Initial Impact Repellency | 80 | 80 | 80 | 70 |
| Initial GRAMS | 0.32 | 0.1 | 0.1 | 0.3 |
| Standard Deviation | 0.15474 | 0.16258 | 0.00577 | 0.00577 |

Table 4 illustrates the efficacy of the extenders of the present invention. The bath used to treat the nonwoven contained 25% less fluorochemical when the extenders of Examples 1 and 2 were present vs. no extender present, while the performance of the treatment was maintained. Further, the extenders of Examples 1 and 2 performed better at the same fluorine level than the extender of Comparative Example B.

TABLE 5

| | Nylon | | | | |
|---|---|---|---|---|---|
| | Fluorochemical | | | | |
| | ZONYL 8932 | ZONYL 8932 | ZONYL 8932 | ZONYL 8932 | ZONYL 8932 |
| Example Extender Oil Repellency | None | Comp. A | Comp. B | 1 Note 1* | 1 |
| Initial | 6 | 5.5 | 6 | 6 | 5 |
| 5 HW** | 3 | 2 | 2 | 6 | 4 |
| 10 HW** | 2 | 1 | 0 | 5 | 2 |

TABLE 5-continued

| | Nylon | | | | |
| --- | --- | --- | --- | --- | --- |
| | Fluorochemical | | | | |
| | ZONYL 8932 | ZONYL 8932 | ZONYL 8932 | ZONYL 8932 | ZONYL 8932 |
| Water Repellency | | | | | |
| Initial | 11 | 10 | 10.5 | 12 | 10 |
| 5 HW** | 8 | 5 | 4 | 11 | 7 |
| 10 HW** | 4 | 4 | 3 | 9 | 4 |
| Spray Repellency | | | | | |
| Initial | 100 | 90 | 90 | 100 | 100 |
| 5 HW** | 50 | 50 | 50 | 75 | 80 |
| 10 HW** | 50 | 50 | 50 | 70 | 50 |

*Note 1: A small amount of blocked isocyanate was added in this Example.
**5 HW = 5 washes; 10 HW = 10 washes Table 5 illustrates the efficacy of the extenders of the present invention. The bath used to treat the nylon contained a 50% reduction of fluorochemical when the extender of Example 1 was used vs. no extender present while the durability of performance of the treatment was maintained. The extender of Example 1 performed better at the same fluorine level when compared to the Comparative Examples A and B. The performance of Example 1 and its durability was excellent. The use of the blocked isocyanate improved the repellency compared to Example 1 without it.

Example 3

To begin, (a) 60 g of 2-ethylhexylmethacrylate; (b) 10 g of poly(oxyethylene)7 methacrylate; (c) 2 g of aqueous 48% N-methylol-acrylamide; (d) 10 g methyl methacrylate; 0.3 g of dodecyl mercaptan, 20 g hexylene glycol, 1.6 g of ARMEEN DM 18D, 1.0 g acetic acid, 3 g of aqueous 2% salt (NaCl) solution, and 80 g of hot (50-60° C.) deionized water were emulsified and then charged to a four-necked flask fitted with a stirrer, thermocouple thermometer, and a water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g of deionized water was then added to initiate polymerization. Temperature rose spontaneously to 80° C. and then began to drop. The temperature controller was reset to 70° C. and the charge was stirred for 3.5 hours under nitrogen. The resulting polymer extender latex weighed 255 g with solids content of 31.6%. It was blended at a ratio of 2:1 of extender to fluorochemical with commercially available fluorochemicals as listed in Table 6 below, and applied to 100% cotton fabric using the fabric treatment process described above in Test Method 1. Generally 45 g/L of the blended product was used in the pad bath. The blended products contained between 2.2 and 3.5% fluorine. A blocked isocyanate was used in the pad bath. The level of the isocyanate was between 5 and 10 g/L. An anti-wrinkle-resin was included at 60 g/L, PERMAFRESH EFC available from Omnova Solutions, Chester, S.C. After application, the fabrics were cured at about 160° C. for 3 minutes. The fabric was allowed to "rest" after treatment and cure. The fabric was tested for water repellency, oil repellency, and spray repellency using Test Methods 2 to 5 described above. After laundering in accordance with Test Method 6 described above, the fabric was retested for water repellency, oil repellency, and spray repellency using the same methods. Results are in Table 6. Comparative Examples A and B were applied to 100% cotton fabric, tested, laundered, and retested in the same manner as Example 3. Results are also in Table 6. Comparative Examples A and B did not enhance the durability of the fluorochemical as the extenders of the present invention did.

Example 4

To begin, (a) 67 g of 2-ethylhexylmethacrylate; (b) 10 g of poly(oxyethylene)7 methacrylate; (c) 2 g of aqueous 48% N-methylol-acrylamide; (f) 3 g of ZONYL TM (E. I. du Pont de Nemours and Company, Wilmington, Del.); 0.3 g of dodecyl mercaptan, 20 g hexylene glycol, 1.6 g of ARMEEN DM 18D, 1.0 g acetic acid, 3 g of aqueous 2% salt (NaCl) solution, and 80 g of hot (50-60° C.) deionized water were emulsified and then charged to a four-necked flask fitted with a stirrer, thermocouple thermometer, and a water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g of deionized water was then added to initiate polymerization. Temperature rose spontaneously to 77° C. and then began to drop. The temperature controller was reset to 70° C. and the charge was stirred for 3.5 hours under nitrogen. The resulting polymer extender latex weighed 252 g with solids content of 31.6%. It was blended at a ratio of 2:1 of extender to fluorochemical with commercially available fluorochemicals as listed in Table 6 below. The blends were applied to 100% cotton fabric, laundered and retested as described in Example 3. Results are in Table 6. The inclusion of the fluorinated monomer in the extender did not appear to increase the copolymer extender effectiveness.

Example 5

To begin, (a) 63 g of 2-ethylhexylmethacrylate; (b) 10 g of poly(oxyethylene)7 methacrylate; (c) 2 g of aqueous 48% N-methylol-acrylamide; (f) 7 g of ZONYL (E. I. du Pont de Nemours and Company, Wilmington, Del.); 0.3 g of dodecyl mercaptan, 20 g hexylene glycol, 1.6 g of ARMEEN DM 18D, 1.0 g acetic acid, 3 g of aqueous 2% salt (NaCl) solution, and 80 g of hot (50-60° C.) deionized water were emulsified and then charged to a four-necked flask fitted with a stirrer, thermocouple thermometer, and a water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g of deionized water was then added to initiate polymerization. Temperature rose spontaneously to 78° C. and then began to drop. The temperature controller was reset to 70° C. and the charge was stirred for 3.5 hours under nitrogen. The resulting polymer extender latex weighed 253 g with solids content of 31.5%. It was blended at a ratio of 2:1 of extender to fluorochemical with commercially available fluorochemicals as listed in Table 6. The blend was applied to 100% cotton fabric, tested, laundered, and retested as in Example 3. Results are in Table 6. The inclusion of the fluorinated monomer in the extender did not appear to increase the copolymer extender effectiveness.

Example 6

To begin, (a) 70 g of 2-ethylhexylmethacrylate; (b) 10 g poly(oxyethylene)7 methacrylate; (c) 2 g of aqueous 48% N-methylol-acrylamide; (e) 0.3 g ethylene dimethacrylate; 1.6 g of ARMEEN DM 18D, 1.0 g acetic acid, 0.3 g of dodecyl mercaptan, 20 g hexylene glycol, 3 g of aqueous 2% salt (NaCl) solution, and 80 g of hot (50-60° C.) deionized water were emulsified and then charged to a four-necked flask fitted with a stirrer, thermocouple thermometer, and a water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g of deionized water was then added to initiate polymerization. Temperature rose spontaneously to 79° C. and then began to drop. The temperature controller was reset to 70° C. and the charge was stirred for 3.5 hours under nitrogen. The resulting polymer extender latex weighed 252 g with solids content of 32.2%. It was blended at a ratio of 2:1 of extender to fluorochemical with commercially available fluorochemicals as listed in Table 6. The blend was applied to 100% cotton fabric, tested, laundered, and retested as in Example 3. Results are in Table 6.

Example 7

To begin, (a) 70 g of 2-ethylhexylmethacrylate; (b) 10 g poly(oxyethylene)7 methacrylate; (c) 2 g of aqueous 48% N-methylol-acrylamide; (e) 0.5 g ethylene dimethacrylate; 1.6 g of ARMEEN DM 18D, 1.0 g acetic acid, 0.3 g of dodecyl mercaptan, 20 g hexylene glycol, 3 g of aqueous 2% salt (NaCl) solution, and 80 g of hot (50-60° C.) deionized water were emulsified and then charged to a four-necked flask fitted with a stirrer, thermocouple thermometer, and a water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g of deionized water was then added to initiate polymerization. Temperature rose spontaneously to 79° C. over about 10 minutes and then began to drop. The temperature controller was reset to 70° C. and the charge was stirred for 3.5 hours under nitrogen. The resulting polymer extender latex weighed 251 g with solids content of 31.7%. It was blended at a ratio of 2:1 of extender to fluorochemical with commercially available fluorochemicals as listed in Table 6. The blend was applied to 100% cotton fabric, tested, laundered, and retested as in Example 3. Results are in Table 6.

Example 8

To begin, (a) 55 g of 2-ethylhexylmethacrylate; (b) 10 g of poly(oxyethylene)7 methacrylate; (c) 2 g of aqueous 48% N-methylol-acrylamide; (d) 15 g steryl methacrylate; 0.3 g of dodecyl mercaptan, 20 g hexylene glycol, 1.6 g of Armeen DM 18D, 1.0 g acetic acid, 3 g of aqueous 2% salt (NaCl) solution, and 80 g of hot (50-60° C.) deionized water were emulsified and then charged to a four-necked flask fitted with a stirrer, thermocouple thermometer, and a water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g of deionized water was then added to initiate polymerization. Temperature rose spontaneously to 77° C. and then began to drop. The temperature controller was reset to 70° C. and the charge was stirred for 3.5 hours under nitrogen. The resulting polymer extender latex weighed 241 g with solids content of 31.3%. It was blended at a ratio of 2:1 of extender to fluorochemical with commercially available fluorochemicals as listed in Table 6. The blend was applied to 100% cotton fabric using the fabric, tested, laundered, and retested as in Example 3. Results are in Table 6.

Example 9

To begin, (a) 70 g of 2-ethylhexylmethacrylate; (b) 7 g of poly(oxyethylene)7 methacrylate; (c) 2 g of aqueous 48% N-methylol-acrylamide; 0.3 g of dodecyl mercaptan, 20 g hexylene glycol, 1.6 g of ARMEEN DM 18D, 1.0 g acetic acid, 3 g of aqueous 2% salt (NaCl) solution, and 80 g of hot (50-60° C.) deionized water were emulsified and then charged to a four-necked flask fitted with a stirrer, thermocouple thermometer, and water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g deionized water was then added to initiate polymerization. The temperature of the mix rose spontaneously to 79° C. over about 15 minutes, and then began to decline. The temperature controller was reset to 70° C., and the charge was stirred for 3.5 hours under nitrogen. The resulting polymer extender latex weighed 249 g with solids content of 30.7%. It was blended at a ratio of 2:1 of extender to fluorochemical with commercially available fluorochemicals as listed in Table 6. The blend was applied to 100% cotton fabric, tested, laundered, and retested as in Example 3. Results are in Table 6.

Example 10

To begin, (a) 70 g of 2-ethylhexylmethacrylate; (b) 10 g poly(oxyethylene)7 methacrylate; 1.6 g of ARMEEN DM 18D, 1.0 g acetic acid, 0.3 g of dodecyl mercaptan, 20 g hexylene glycol, 3 g of aqueous 2% salt (NaCl) solution, and 80 g of hot (50-60° C.) deionized water were emulsified and then charged to a four-necked flask fitted with a stirrer, thermocouple thermometer, and a water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g of deionized water was then added to initiate polymerization. Temperature rose spontaneously to 80° C. and then began to drop. The temperature controller was reset to 70° C. and the charge was stirred for 3.5 hours under nitrogen. The resulting polymer extender latex weighed 251 g with solids content of 31.9%. It was blended at a ratio of 2:1 of extender to fluorochemical with commercially available fluorochemicals as listed in Table 6. The blend was applied to 100% cotton fabric, tested, laundered, and retested as in Example 3. Results are listed in Table 6.

Example 11

To begin, (a) 60 g of 2-ethylhexylmethacrylate; (b) 10 g of poly(oxyethylene)7 methacrylate; (d) 10 g methyl methacrylate; 0.3 g of dodecyl mercaptan, 20 g hexylene glycol, 1.6 g of Armeen DM 18D, 1.0 g acetic acid, 3 g of aqueous 2% salt (NaCl) solution, and 80 g of hot (50-60° C.) deionized water were emulsified and then charged to a four-necked flask fitted with a stirrer, thermocouple thermometer, and a water condenser. The charge was rinsed into the flask with 75 g of hot di water and purged with nitrogen at 65° C. for 30 minutes. Then, 0.08 g of "VAZO" 56 WSP (E. I. du Pont de Nemours and Company, Wilmington, Del.) dissolved in 2 g of deionized water was then added to initiate polymerization. Temperature rose spontaneously to 78° C. and then began to drop. The temperature controller was reset to 70° C. and the charge was stirred for 3.5 hours under nitrogen. The resulting polymer extender latex weighed 258 g with solids content of 31.3%. It was blended at a ratio of 2:1 of extender to fluorochemical with commercially available fluorochemicals as listed in Table 6. The blend was applied to 100% cotton fabric, tested, laundered, and retested as in Example 3. Results are listed in Table 6.

The durability of performance after washing the treated fabrics the indicated number of times for the blends containing extenders of Examples 1-11 was superior to the blends containing Comparative Examples A and B when applied at the same fluorine level, especially with reference to the oil and water drop repellency.

Comparative Example C

To begin, 3 g of aqueous 2% salt (NaCl) solution, 4.2 g hexylene glycol, 2 g of ARMEEN DM 18D, 6 g of ethoxylated tridecyl alcohol (ETHAL TDA 5, available from Ethox Chemicals, Greenville, S.C.) and 217 g of water were charged to a four-necked flask fitted with a stirrer, thermocouple thermometer, and a water condenser. The charge was purged with nitrogen at 65° C. for 30 minutes. Then, 0.06 g of "VAZO" 56 WSP (E. I. du Pont de Nemours and Company, Wilmington, Del.) in 2 g water was then added. Then a slow, steady, drop wise addition of a mixture of (b)

TABLE 6

100% Cotton

| | Fluorochemical | | | | | | | | | | | | | |
|---|---|---|---|---|---|---|---|---|---|---|---|---|---|---|
| | ZONYL 8932 | ZONYL 8300 | ZONYL 8932 | ZONYL 8300 | ZONYL 8932 | ZONYL 8300 | ZONYL 8932 | ZONYL 8300 | ZONYL 8932 | ZONYL 8300 | ZONYL 8932 | ZONYL 8300 | ZONYL 8932 | ZONYL 8300 |
| Example Extender | 1 | 1 | A | A | B | B | 2 | 2 | 3 | 3 | 4 | 4 | 5 | 5 |
| Oil Repellency | | | | | | | | | | | | | | |
| Initial | 7 | 7 | 6 | 4 | 5 | 6 | 6+ | 7 | 6+ | 6 | 7 | 7 | 7 | 7 |
| 5 HW* | 6 | 6 | 2 | 2 | 1 | 4 | 6 | 6 | 6 | 6 | 6 | 6 | 6 | 6 |
| 10 HW* | 6 | 5 | 2 | 2 | 0 | 2 | 5 | 5 | 5 | 5 | 5 | 5 | 5 | 5 |
| Water Repellency | | | | | | | | | | | | | | |
| Initial | 12 | 7 | 11 | 5 | 11 | 6 | 12 | 7 | 12 | 12 | 12 | 12 | 12 | 12 |
| 5 HW* | 11 | 7 | 5 | 4 | 4 | 5 | 11 | 7 | 12 | 12 | 11 | 12 | 12 | 11 |
| 10 HW* | 11 | 6 | 4 | 4 | 3 | 4 | 9 | 5 | 7 | 7 | 10 | 7 | 10 | 8 |
| Spray Repellency | | | | | | | | | | | | | | |
| Initial | 100 | 100 | 90 | 90 | 100 | 100− | 100 | 90 | 100− | 100− | 100 | 100 | 100 | 100 |
| 5 HW* | 70 | 70− | 50 | 50+ | 50 | 50 | 70− | 50 | 50+ | 70 | 70− | 50 | 70− | 50+ |
| 10 HW* | 50 | 50 | 50 | 50 | 50 | 50 | 50 | 50/0 | 50 | 50 | 50 | 50 | 50 | 50 |

*5 HW = 5 washes; 10 HW = 10 washes

| | Fluorochemical | | | | | | | |
|---|---|---|---|---|---|---|---|---|
| | ZONYL 8932 | ZONYL 8300 | ZONYL 8932 | ZONYL 8300 | ZONYL 8932 | ZONYL 8932 | ZONYL 8932 | ZONYL 8932 |
| Example Extender | 6 | 6 | 7 | 7 | 8 | 9 | 10 | 11 |
| Oil Repellency | | | | | | | | |
| Initial | 7 | 7 | 7 | 6 | 7 | 7 | 5+ | 7 |
| 5 HW* | 5 | 6 | 5 | 5 | 6 | 5 | 5+ | 5 |
| 10 HW* | 5 | 5 | 5 | 4 | 5 | 4 | 3 | 3 |
| 20 HW* | | | | | 1 | 2 | 2 | 2 |
| Water Repellency | | | | | | | | |
| Initial | 12 | 12 | 12 | 12 | 12 | 12 | 12 | 9+ |
| 5 HW* | 10 | 7 | 9 | 6 | 9 | 8 | 11 | 9 |
| 10 HW* | 8 | 5 | 8 | 5 | 9 | 7 | 5 | 5 |
| 20 HW* | | | | | 5 | 5 | 4 | 3 |
| Spray Repellency | | | | | | | | |
| Initial | 100 | 100− | 100 | 100− | 100 | 100 | 100 | 100 |
| 5 HW* | 70− | 50 | 50+ | 50 | 50+ | 70− | 70+ | 70 |
| 10 HW* | 50 | 50 | 50 | 50 | 50 | 50 | 50+ | 50 |
| 20 HW* | | | | | 50 | 50 | 50 | 0 |

*5 HW = 5 washes; 10 HW = 10 washes; 20 HW = 20 washes 4 g of poly(oxyethylene)7 methacrylate, (d) 76 g methyl methacrylate, and 0.8 g of dodecyl mercaptan, was begun. The monomer mixture was added over about 80 minutes, with temperature maintained between 65 and 67° C. Then the charge was stirred for 2.5 hours at 70° C. under nitrogen. The resulting polymer latex weighed 309 g with solids content of 28%. It was blended at a ratio of 2:1 of extender to fluorochemical with ZONYL 8932 available from E. I. du Pont de Nemours and Company. The blended products contained 3.5% fluorine. The blend was applied to 100% cotton fabric using the fabric treatment process described above in Test Method 1. 45 g/L of the blended product was used in the pad bath. A blocked isocyanate was also used in the pad bath. The level of the isocyanate was between 5 and 10 g/L. An anti-wrinkle-resin was included at 60 g/L, PERMAFRESH EFC available from Omnova Solutions, Chester, S.C. After application, the fabrics were cured at about 160° C. for 3 minutes. The fabric was allowed to "rest" after treatment and cure. The fabric was tested for water repellency, oil repellency, and spray repellency using Test Methods 2 to 4 described above. After laundering in accordance with Test Method 6 described above, the fabric was retested for water repellency, oil repellency, and spray repellency using the same methods. Results are in Table 7.

Comparative Example D

To begin, 3 g of aqueous 2% salt (NaCl) solution, 4.2 g hexylene glycol, 2 g of ARMEEN DM 18D, 6 g of ethoxylated tridecyl alcohol (ETHAL TDA 5, available from Ethox Chemicals, Greenville, S.C.) and 217 g of water were charged to a four-necked flask fitted with a stirrer, thermocouple thermometer, and a water condenser. The charge was purged with nitrogen at 65° C. for 30 minutes. Then, 0.06 g of "VAZO" 56 WSP (E. I. du Pont de Nemours and Company, Wilmington, Del.) in 2 g water was then added. Then a slow, steady, drop wise addition of a mixture of (b) 4 g of poly(oxyethylene)7 methacrylate, (d) 76 g methyl methacrylate, 2 g of aqueous 48% N-methylol-acrylamide, and 0.8 g of dodecyl mercaptan, was begun. The monomer mixture was added over about 80 minutes, with temperature maintained between 65 and 67° C. Then the charge was stirred for 2.5 hours at 70° C. under nitrogen. The resulting polymer latex weighed 311 g with solids content of 28%. It was blended with ZONYL 8932 at a ratio of 2:1 of extender to fluorochemical. The blend was applied to 100% cotton fabric, tested, laundered, and retested as in Comparative Example C. Results are in Table 7.

Comparative Example E

To begin, 3 g of aqueous 2% salt (NaCl) solution, 4.2 g hexylene glycol, 2 g of ARMEEN DM 12D, 6 g of ethoxylated tridecyl alcohol (ETHAL TDA 5, available from Ethox Chemicals, Greenville, S.C.) and 217 g of water were charged to a four-necked flask fitted with a stirrer, thermocouple thermometer, and a water condenser. The charge was purged with nitrogen at 65° C. for 30 minutes. Then, the nitrogen flow was switched to a slow sweep, and 0.05 g of potassium persulfate in 2 g water was added. Then a slow, steady, drop wise addition of a mixture of (b) 4 g of poly(oxyethylene)7 methacrylate, (d) 76 g methyl methacrylate, 0.3 g of dodecyl mercaptan, was begun. The monomer mixture was added over about 90 minutes, with temperature maintained between 64 and 67 C. Then the charge was stirred for 2.5 hours at 70° C. under nitrogen. The resulting polymer latex weighed 307 g with solids content of 27.6%. It was blended at a ratio of 2:1 of extender to fluorochemical with ZONYL 8932. The blend was applied to 100% cotton fabric, tested, laundered, and retested as in Comparative Example C. Results are in Table 7.

TABLE 7

| | 100% Cotton | | | |
|---|---|---|---|---|
| Fluorochemical | ZONYL 8932 | ZONYL 8932 | ZONYL 8932 | ZONYL 8932 |
| Extender Example | 1 | Comp. C | Comp. D | Comp. E |
| Oil Repellency | | | | |
| Initial | 7 | 5 | 5 | 6 |
| 5 HW* | 6 | 3 | 4 | 4 |
| 10 HW* | 6 | 2 | 2 | 2 |
| Water Repellency | | | | |
| Initial | 12 | 11 | 11 | 11 |
| 5 HW* | 11 | 5 | 5 | 7 |
| 10 HW* | 11 | 4 | 4 | 5 |
| Spray Repellency | | | | |
| Initial | 100 | 100− | 100− | 100− |
| 5 HW* | 70 | 70 | 70 | 70 |
| 10 HW* | 50 | 70− | 50 | 50 |

*5 HW = 5 washes; 10 HW = 10 washes

The durability after washing the treated fabric the indicated number of times for performance of the blend containing the extender of Example 1 is superior to the Comparative Examples, C, D and E when applied at the same fluorine level, especially with reference to the oil and water drop repellency.

Comparative Examples F and G

Comparative Examples F and G are the commercially available extenders PHOBOTEX JVA available from Ciba Specialty Chemicals, High Point, N.C. and FREEPEL 1225WR available from Omnova Solutions Chester, S.C. These and the extender polymer of Example 1 were each blended separately at a ratio of 2:1 of extender to fluorochemical with ZONYL 8300 and ZONYL 8932, fluorochemicals available from E. I. du Pont de Nemours and Company, Wilmington, Del. The blend was applied to 100% cotton using the process of Test Method 1.45 g/L of the blended product was used in the pad bath. The blended products contained between 2.2 and 3.5% fluorine. A blocked isocyanate was also used in the pad bath. The level of the isocyanate was between 5 and 10 g/L. An anti-wrinkle-resin was included at 60 g/L, PERMAFRESH EFC available from Omnova Solutions, Chester, S.C. After application, the fabrics were cured at about 160° C. for 3 minutes. The fabric was allowed to "rest" after treatment and cure. The fabric was tested, laundered, and retested as in Example 3. Results are in Table 8.

TABLE 8

100% Cotton

| | Fluorochemical | | | | | |
|---|---|---|---|---|---|---|
| | ZONYL 8932 | ZONYL 8300 | ZONYL 8932 | ZONYL 8932 | ZONYL 8300 | ZONYL 8300 |
| Example Extender | 1 | 1 | Comp. F | Comp. G | Comp. F | Comp. G |
| Oil Repellency | | | | | | |
| Initial | 7 | 7 | 6 | 4 | 6 | 6 |
| 5 HW* | 6 | 6 | 4 | 2 | 3 | 4 |
| 10 HW* | 5 | 6 | 2 | 1 | 1 | 1 |
| Water Repellency | | | | | | |
| Initial | 12 | 12 | 11 | 6 | 12 | 12 |
| 5 HW* | 12 | 8 | 7 | 4 | 5 | 6 |
| 10 HW* | 8 | 7 | 4 | 4 | 0 | 1 |
| Spray Repellency | | | | | | |
| Initial | 100 | 100 | 100 | 70 | 90 | 100 |
| 5 HW* | 70− | 50 | 50 | 50 | 50 | 50 |
| 10 HW* | 50 | 50 | 50 | 50 | 50/0 | 50/0 |

*5 HW = 5 washes; 10 HW = 10 washes

The durability of performance after washing the treated fabric the indicated number of times for the blends containing the commercial extenders (Comparative Examples F and G) are not equivalent to the blends of the fluorochemical with the extenders of the present invention (Example 1).

Example 12

The extender of Example 1 was blended with ZONYL 8932 in a 2:1 ratio of extender to ZONYL 8932, and with a blocked isocyanate (1% on weight of bath (owb)) and a softener (1% owb). The blend contained a ratio of ZONYL 8932 to extender to softener to blocked isocyanate equal to 2:1:0.2:0.3. The blocked isocyanate used in this case was HYDROPHOBOL XAN (Ciba Specialty Chemicals, High Point, N.C.) and the softener used in this case was ARQUAD 2HT/75 (Akzo-Nobel, McCook, Ill.). This formulated product was applied to 100% cotton fabric at a level of 45 g/L in the pad bath using the process of Test Method 1. An anti-wrinkle resin was included in the pad bath at 60 g/L, PERMAFRESH EFC available from Omnova Solutions, Chester, S.C. After application, the fabrics were cured at about 160° C. for about 3 minutes. The fabric was allowed to "rest" after treatment and cure. The fabric was tested for water repellency, oil repellency, and spray repellency using Test Methods 2 to 4 described above. After laundering in accordance with Test Method 6 described above, the fabric was retested for water repellency, oil repellency, and spray repellency using the same methods. Results are in Table 9.

Example 13

The extender of Example 1 was blended with ZONYL 8932 and with a blocked isocyanate (1% owb) in a ratio of 3.6:1 of extender to fluorochemical, to blocked isocyanate. This formulated product was applied to 100% cotton fabric at a level of 30 g/L in the pad bath using the process of Test Method 1. An anti-wrinkle resin was included in the pad bath at 60 g/L, PERMAFRESH EFC available from Omnova Solutions, Chester, S.C. After application, the fabrics were cured at about 160° C. for about 3 minutes. The fabric was allowed to "rest" after treatment and cure. The fabric was tested for water repellency, oil repellency, and spray repellency using Test Methods 2 to 4 described above. After laundering in accordance with Test Method 6 described above, the fabric was retested for water repellency, oil repellency, and spray repellency using the same methods. Results are in Table 9.

Example 14

The extender of Example 1 was blended with ZONYL 8932 and a blocked isocyanate (1% owb) at a ratio of extender to fluorochemical to blocked isocyanate of 2:1:0.3. This formulated product was applied to 100% cotton fabric at a level of 45 g/L in the pad bath using the process of Test Method 1. An anti-wrinkle resin was included in the pad bath at 60 g/L, PERMAFRESH EFC available from Omnova Solutions, Chester, S.C. After application, the fabrics were cured at about 160° C. for about 3 minutes. The fabric was allowed to "rest" after treatment and cure. The fabric was tested for water repellency, oil repellency, and spray repellency using Test Methods 2 to 4 described above. After laundering in accordance with Test Method 6 described above, the fabric was retested for water repellency, oil repellency, and spray repellency using the same methods. Results are in Table 9.

Example 15

The extender of Example 1 was blended with ZONYL 8932 and a blocked isocyanate (1% owb) at a ratio of extender to fluorochemical to blocked isocyanate of 3:1:0.3. This formulated product was applied to 100% cotton fabric at a level of 30 g/L in the pad bath using the process of Test Method 1. An anti-wrinkle resin was included in the pad bath at 60 g/L, PERMAFRESH EFC available from Omnova Solutions, Chester, S.C. After application, the fabrics were cured at about 160° C. for about 3 minutes. The fabric was allowed to "rest" after treatment and cure. The fabric was tested for water repellency, oil repellency, and spray repellency using Test Methods 2 to 4 described above.

After laundering in accordance with Test Method 6 described above, the fabric was retested for water repellency, oil repellency, and spray repellency using the same methods. Results are in Table 9.

Example 16

The extender of Example 1 was blended with ZONYL 8932 and a blocked isocyanate (1% owb) at a ratio of extender to fluorochemical to blocked isocyanate of 6:1:0.3. This formulated product was applied to 100% cotton fabric at a level of 30 g/L in the pad bath using the process of Test Method 1. An anti-wrinkle resin was included in the pad bath at 60 g/L, PERMAFRESH EFC available from Omnova Solutions, Chester, S.C. After application, the fabrics were cured at about 160° C. for about 3 minutes. The fabric was allowed to "rest" after treatment and cure. The fabric was tested for water repellency, oil repellency, and spray repellency using Test Methods 2 to 4 described above. After laundering in accordance with Test Method 6 described above, the fabric was retested for water repellency, oil repellency, and spray repellency using the same methods. Results are in Table 9.

TABLE 9

100% Cotton

| | | | Example | | | |
|---|---|---|---|---|---|---|
| | ZONYL 8932 | 12 | 13 | 14 | 15 | 16 |
| Oil Repellency | | | | | | |
| Initial | 6 | 7 | 6 | 7 | 6 | 2 |
| 5 HW* | 5 | 6 | 4.5 | 6.5 | 5 | 1 |
| 10 HW* | 3 | 5 | 2.5 | 5 | 3 | 1 |
| 20 HW* | 1 | 3.5 | 2 | 4.5 | 1 | 0 |
| Water Repellency | | | | | | |
| Initial | 12 | 12 | 12 | 12 | 12 | 5 |
| 5 HW* | 7 | 11 | 8 | 11 | 6 | 4 |
| 10 HW* | 5 | 10 | 5 | 11 | 4 | 3 |
| 20 HW* | 3 | 4 | 4 | 7 | 4 | 3 |
| Spray Repellency | | | | | | |
| Initial | 100 | 100 | 100 | 100 | 100 | 90 |
| 5 HW* | 50 | 50 | 50 | 80 | 50 | 50 |
| 10 HW* | 50 | 50 | 50 | 50+ | 50 | 50 |
| 20 HW* | 50 | 50 | 50 | 50 | 50 | 50 |

*5HW = 5 washes; 10 HW = 10 washes; 20 HW = 20 washes

The results show that the extender of the present invention can be utilized in a number of formulations with and without softeners and at various application levels. The fluorochemical ZONYL 8932, when applied alone with no extender present, was applied at a 30 g/L level in the pad bath using the same conditions as Examples 12-16.

The data demonstrates that Examples 12-15 provide comparable or superior durability of repellency with less percent fluorine applied to the fabric. Example 16 had comparable spray repellency with a reduction in fluorochemical of 6:1 compared to ZONYL 8932 alone.

What is claimed is:

1. A polymer extender composition comprising monomers copolymerized in the following percentages by weight:
    (a) from about 60% to about 94% of a monomer, or mixture of monomers, of the formula I:

[CH$_3$—(CH$_2$)$_p$][CH$_3$(CH$_2$)$_n$]CHCH$_2$—OC(O)—C(R)=CH$_2$ (I), and (b) from about 5% to about 20% of a monomer, or mixture of monomers, of the formula II:

H—(OCH$_2$CH$_2$)$_m$—O—C(O)—C(R)=CH$_2$ (II)

(c) from about 0% to about 3% of a monomer, or mixture of monomers, of the formula III:

HO—CH$_2$—NH—C(O)—C(R)=CH$_2$ (III)

(d) from about 0% to about 20% of a monomer, or mixture of monomers, of formula IV:

R$^1$—OC(O)—C(R)=CH$_2$ (IV)

(e) from about 0% to about 2% of ethylene dimethacrylate, and
    (f) from about 0% to about 10% of a monomer, or mixture of monomers, of formula (V):

R$_f$—CH$_2$CH$_2$—OC(O)—C(R)=CH$_2$ (V)

wherein
    each R is independently H or CH$_3$;
    R$^1$ is an alkyl chain from 1 to about 18 carbon atoms;
    n is 1 to about 10;
    p is 1 to about 20 and
    m is 2 to about 10, and
    R$_f$ is a straight or branched-chain perfluoroalkyl group of from 2 to about 20 carbon atoms, or a mixture thereof.

2. The composition of claim 1 wherein monomer (a) is 2-ethylhexyl(meth)acrylate.

3. The composition of claim 1 wherein m in monomer (b) is between about 5 and about 10.

4. The composition of claim 1 wherein monomer (c) is N-methylolacrylamide.

5. The composition of claim 1 wherein monomer (d) is methyl methacrylate.

6. The composition of claim 1 wherein for monomer (f), R$_f$ has the formula: CF$_3$CF$_2$(CF$_2$)$_x$, wherein x is 6 to 18, or a mixture thereof.

7. The composition of claim 6 wherein x is a mixture of 6, 8, 10, 12, 14, 16, and 18 in a mixture in the respective relative amounts of about 33%, 24%, 12%, 6%, 2%, 1% and 0.5%.

8. The composition of claim 1 as an aqueous dispersion.

9. The composition of claim 1 further comprising an agent which, when applied to a substrate, provides a surface effect.

10. The composition of claim 9 wherein the surface effect is no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects.

11. The composition of claim 9 wherein the agent is a fluorinated polymer.

12. The composition of claim 11 wherein the fluorine content is from about 1.5 to about 6.6% by weight.

13. The composition of claim 11 wherein the ratio of extender composition to fluorinated polymer is from about 1:10 to about 6:1.

14. The composition of claim 11 wherein the fluorinated polymer is a fluorine-containing polyurethane or poly(meth)acrylate, or mixture thereof.

15. The composition of claim 1 or 11 further comprising a blocked isocyanate.

16. The composition of claim 1 or 11 further comprising at least one additional extender.

17. The composition of claim 9 further comprising an additive selected from the group consisting of a surfactant, emulsifier, pH adjuster, cross linker, wetting agent, softener, and wax extender.

18. A method of treating a substrate comprising contacting the substrate with a composition comprising i) an agent which provides a surface effect and ii) a polymer extender composition comprising monomers copolymerized in the following percentages by weight:

(a) from about 60% to about 94% of a monomer, or mixture of monomers, of the formula I:

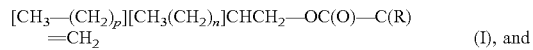

(b) from about 5% to about 20% of a monomer, or mixture of monomers, of the formula II:

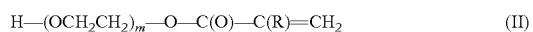

(c) from about 0% to about 3% of a monomer, or mixture of monomers, of the formula III:

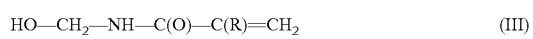

(d) from about 0% to about 20% of a monomer, or mixture of monomers, of formula IV:

(e) from about 0% to about 2% of ethylene dimethacrylate, and (f) from about 0% to about 10% of a monomer, or mixture of monomers, of formula (V):

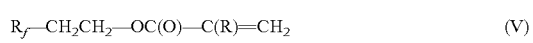

wherein each R is independently H or $CH_3$;

$R^1$ is an alkyl chain from 1 to about 18 carbon atoms;

n is 1 to about 10;

p is 1 to about 20 and m is 2 to about 10, and $R_f$ is a straight or branched-chain perfluoroalkyl group of from 2 to about 20 carbon atoms, or a mixture thereof.

19. The method of claim 18 wherein the surface effect is no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects.

20. The method of claim 18 wherein the agent is a fluorinated polymer.

21. The method of claim 20 wherein the ratio of the extender composition to the fluorinated polymer is from about 1:10 to about 6:1.

22. The method of claim 18 wherein the composition further comprises a blocked isocyanate or at least one additional extender.

23. The method of claim 18 wherein the composition further comprises an additive selected from the group consisting of a surfactant, emulsifier, pH adjuster, cross linker, wetting agent, softener, and wax extender.

24. The method of claim 18 wherein the substrate is a fiber, textile, fabric, fabric blend, paper, nonwoven, leather or combination thereof.

* * * * *